United States Patent [19]

Tanaka et al.

[11] Patent Number: 5,097,547
[45] Date of Patent: Mar. 24, 1992

[54] VIBRATION ABSORBING DEVICE FOR STRUCTURE

[75] Inventors: Naoki Tanaka; Kuniaki Sato; Mikio Kobayashi; Koji Ishii; Toshiyuki Fukimoto; Yoshikatsu Miura; Toshikazu Yamada, all of Tokyo, Japan

[73] Assignee: Kajima Corporation, Tokyo, Japan

[21] Appl. No.: 573,846

[22] Filed: Aug. 28, 1990

[51] Int. Cl.⁵ .............................................. E04H 9/02
[52] U.S. Cl. .................................... 5/173 R; 52/573
[58] Field of Search ............ 52/167, 573, 235, 167 R; 248/603-610

[56] References Cited

U.S. PATENT DOCUMENTS

| 1,302,482 | 4/1919 | Ross | 248/604 |
| 2,756,013 | 7/1956 | Cunningham | 248/606 |
| 2,881,995 | 4/1959 | Neher | 248/604 |
| 2,936,141 | 5/1960 | Rapata | 248/604 |

FOREIGN PATENT DOCUMENTS

| 254414 | 2/1988 | German Democratic Rep. | 52/167 |
| 348010 | 9/1960 | Switzerland | 248/603 |
| 1270252 | 11/1986 | U.S.S.R. | 52/167 |
| 691231 | 5/1953 | United Kingdom | 248/603 |

Primary Examiner—James L. Ridgill, Jr.
Attorney, Agent, or Firm—James H. Tilberry

[57] ABSTRACT

A vibration absorbing device to be secured between structural and non-structural members of a framed structure. An outer ring may be secured to a structural member and an inner ring is concentrically positioned within said outer ring and may be secured to a non-structural member. Radial spokes interconnecting the inner and outer rings are adapted to elasto-plastically deform when one ring is arcuately shifted relative to the other ring responsive to vibration of the inner and/or outer ring, thereby absorbing the energy of vibration.

13 Claims, 10 Drawing Sheets

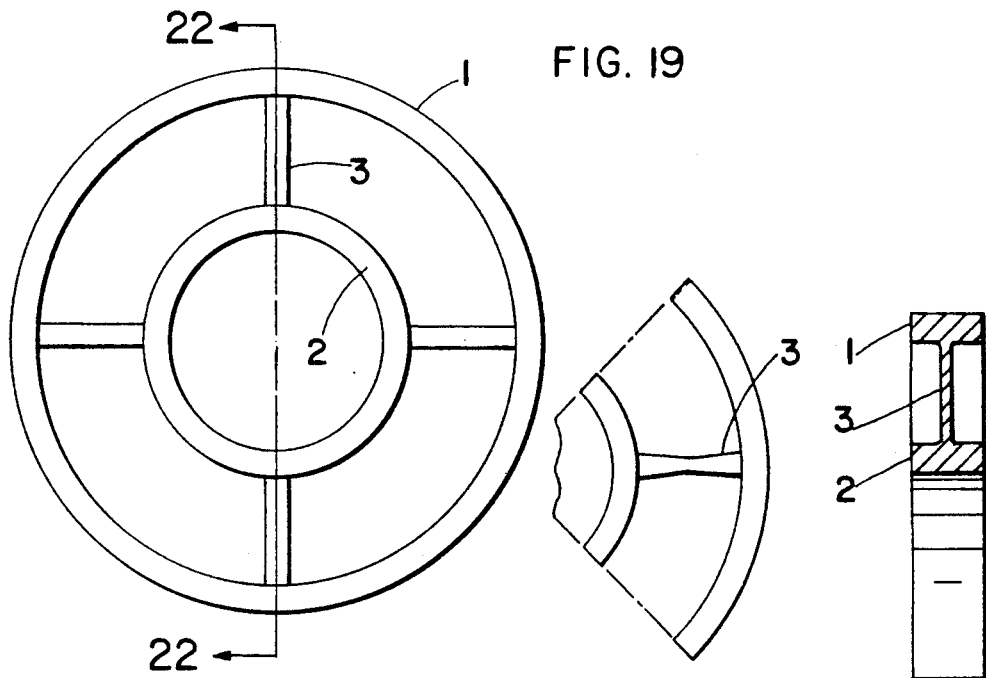
FIG. 19
FIG. 20
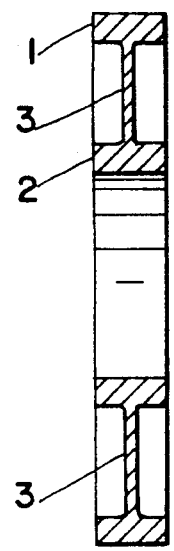
FIG. 22
FIG. 21
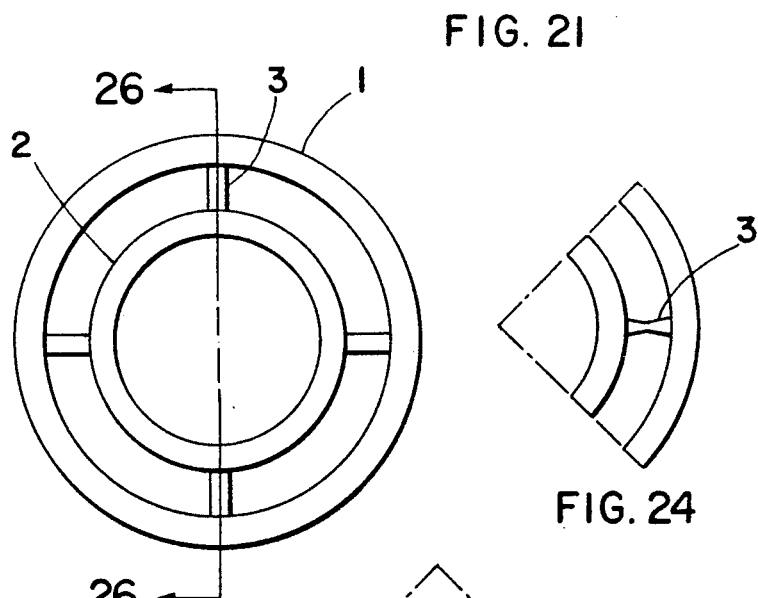
FIG. 23
FIG. 24
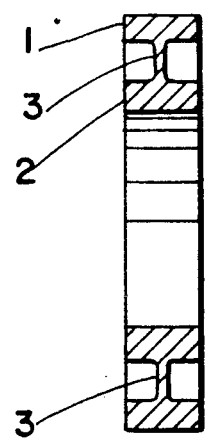
FIG. 26
FIG. 25

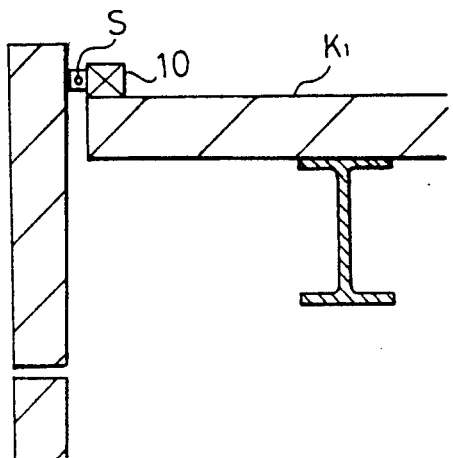
FIG. 27
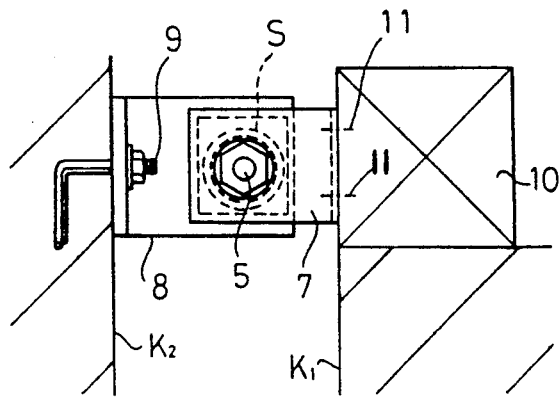
FIG. 28
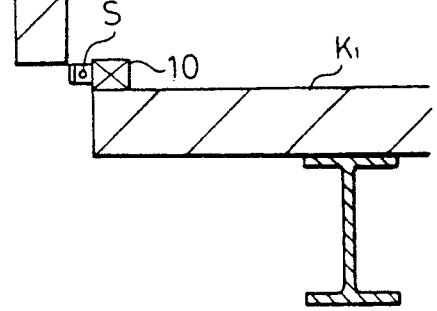
FIG. 29
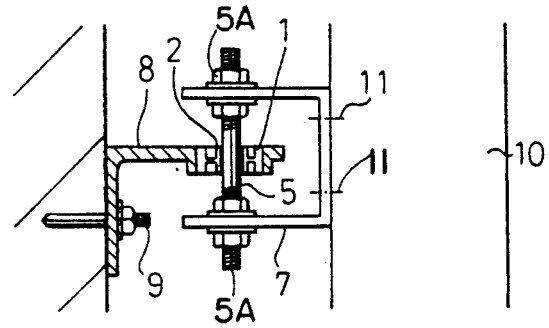
FIG. 30
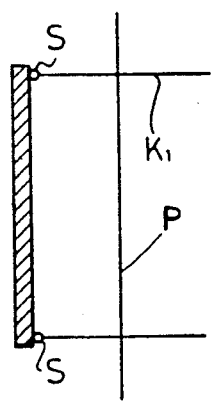
FIG. 31
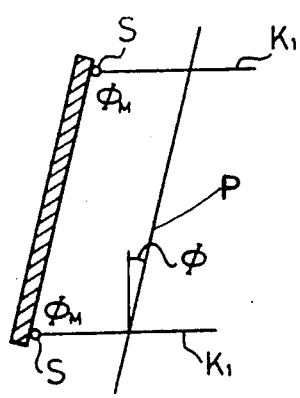

VIBRATION ABSORBING DEVICE FOR STRUCTURE

BACKGROUND OF THE INVENTION

1. Field of the Invention

The field of invention relates to a vibration absorbing device for a structure, and, more particularly, to a vibration absorbing device which is installed in a structural member such as a beam or a pillar and a non-structural member such as non-yield strength walls pin-jointed to each other in a structure, or between structural members. More specifically, the field of invention relates to devices which utilize induced rotation of structural members to absorb vibrational energy input to the structure.

2. Description of the Prior Art

Devices presently known for use in absorbing vibrational energy input to a structure upon occurrence of an earthquake or a wind load include elasto-plastic dampers; viscous dampers; oil dampers; oil dampers utilizing viscosity means; and frictional dampers. Among these prior art dampers, the elasto-plastic damper tends to be most commonly used because it is easy to maintain, it is stable during repetitively applied force, and it has great energy absorbability.

The conventional elasto-plastic damper primarily utilizes relative displacement between an upper structure and a lower structure, or relative displacement between any story in a structure and an adjacent story, wherein the elasto-plastic damper absorbs energy by plastic deformation.

An elasto-plastic damper of the type which utilizes relative displacement between upper and lower structure and/or between adjacent stories of a structure must be of sufficient length to span the upper and lower structures, or the adjacent stories. However, the damper body is usually large and requires sufficient space for installation, whereas the space available for such installation is usually limited.

Several examples of prior art elasto-plastic dampers are shown in U.S. Pat. No. 4,901,486. The efficiency of energy absorption in these devices will be influenced by the distance between opposite ends of the elasto-plastic dampers.

SUMMARY OF THE INVENTION

It is the purpose of the present invention to provide an energy absorbing device which has a mechanism different from that of conventional prior art dampers to provide a high degree of freedom in the installation.

In consideration of the fact that a rotational angle in relative deformation between a structural member and a non-structural member pin-jointed to each other, i.e., an angle made by one member rotated about the pin relative to the other member, is not influenced by the distance between opposite ends of a member, a vibration absorbing device according to the present invention utilizes a rotational angle and the force created when the structural members are rotated relative to each other. The efficiency of energy absorption obtained is substantially equivalent to that of the utilization of relative horizontal displacement.

The pure pin joint is generally constructed such that a pin is passed through brackets projectingly provided on ends of both interconnected members to rotate one bracket about the pin without resistance, while a moment acts on the brackets by restraining the smooth rotation of the brackets, i.e., by fixing the brackets to the pin to create the resistance.

The present invention utilizes the moment itself for an external force corresponding to a horizontal force in the relative horizontal displacement, and simultaneously utilizes the rotational angle due to the moment for an amount of deformation. Also, the present invention provides the vibration absorbing device with parts deformed by the rotation while resisting the moment, whereby the parts are made to be elasto-plastically deformed by bearing a shearing force and a bending moment due to the external force to absorb the vibrational energy through the elasto-plastic hysteresis energy of the deformed parts.

In a preferred embodiment, the vibration absorbing device comprises a pair of concentric energy absorbing rings and connecting members radially projecting therebetween to space the rings apart and a steel shaft axially inserted through and secured to the inner ring. The steel shaft is adapted to transmit a turning force to the inner ring. The outer ring corresponds to one bracket in the usual pin joint, and the steel shaft, or the inner ring united with the steel shaft, corresponds to the pin. The connecting members serve as the deformable parts to resist the turning moment of the shaft.

In a common application, the vibration absorbing device is installed between a structural member and a non-structural member pin-jointed to each other or between two structural members. The outer ring of the energy absorbing ring is fixed to either one of the structural members, while the steel shaft is fixed to the other.

The outer ring and the steel shaft are rotated in opposite directions to each other responsive to the relative rotational deformation of the building members to which the outer ring and the steel shaft are fixed. The vibration absorbing device absorbs the vibrational energy corresponding to the amount of rotation by means of the plastic deformation of the connecting members. The connecting members function as the damper.

OBJECTS OF THE INVENTION

It is among the objects of the invention to provide a novel means of dissipating the energy of vibration imposed upon a building by seismic tremors and/or high winds. It is yet another object of the invention to provide a novel means of utilizing elasto-plastic energy absorbers for this purpose. It is a further object of the invention to provide a vibration absorbing device which comprises only a few parts, is easy and inexpensive to manufacture, and is reliable and maintenance free.

Other and further objects and advantages of the invention will be apparent from the following description when taken in conjunction with the accompanying drawings.

BRIEF DESCRIPTION OF THE DRAWINGS

FIG. 19 is an elevational view of the basic unstressed configuration of the connecting members;

FIGS. 20 and 21 are fragmentary elevational views, similar to FIG. 19, in which the unstressed connecting members are constricted at their midsections;

FIG. 22 is a sectional view taken along the line 22—22 of FIG. 19;

FIG. 23 is an elevational view of an embodiment of the invention in which the connecting members are shorter than the radius of the inner ring and are of basic rectangular configuration;

FIGS. 24 and 25 are fragmentary elevational views, similar to FIG. 23, in which the unstressed connecting members are constricted at their midsections;

FIG. 26 is a sectional view taken along the line 26—26 of FIG. 23;

FIG. 27 is an elevational view in section showing an embodiment of the invention in which the vibration absorbing device is installed between a slab, constituting a structural member, and a panel of a curtain wall, constituting a non-structural member;

FIG. 28 is an enlarged elevational view in section of FIG. 27, showing the connection of opposite ends of the vibration absorbing device in greater detail;

FIG. 29 is a plan view, partially in section, of the device shown in FIG. 28;

FIG. 30 is a schematic representation of the panel and slab of FIG. 27 prior t deformation;

FIG. 31 is a schematic representation of the panel and slab of FIG. 27 after deformation;

DETAILED DESCRIPTION OF THE PREFERRED EMBODIMENTS

Figure 1:
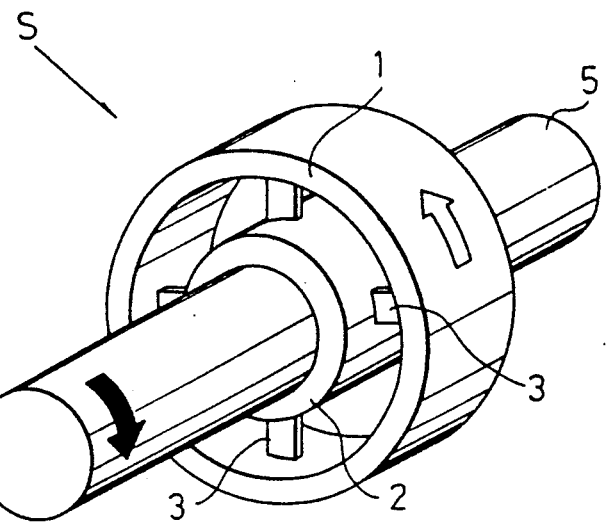
FIG. 1 is a perspective view of a preferred embodiment of the invention comprising an outer ring, an inner ring, connecting members therebetween and a shaft-type connecting pin received in and secured to the inner ring.
Figure 4:
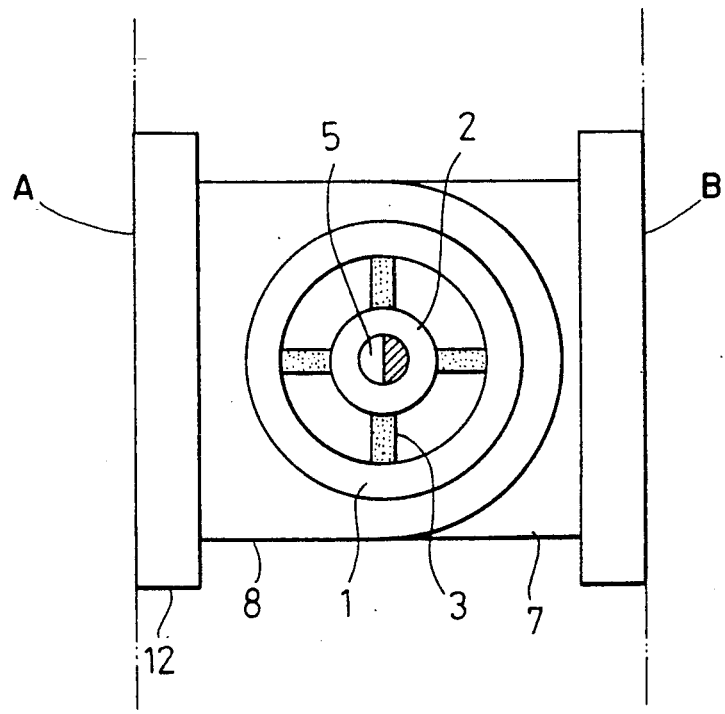
FIG. 4 is an elevational view of a preferred embodiment of the invention installed in a structure prior to deformation.
Figure 5:
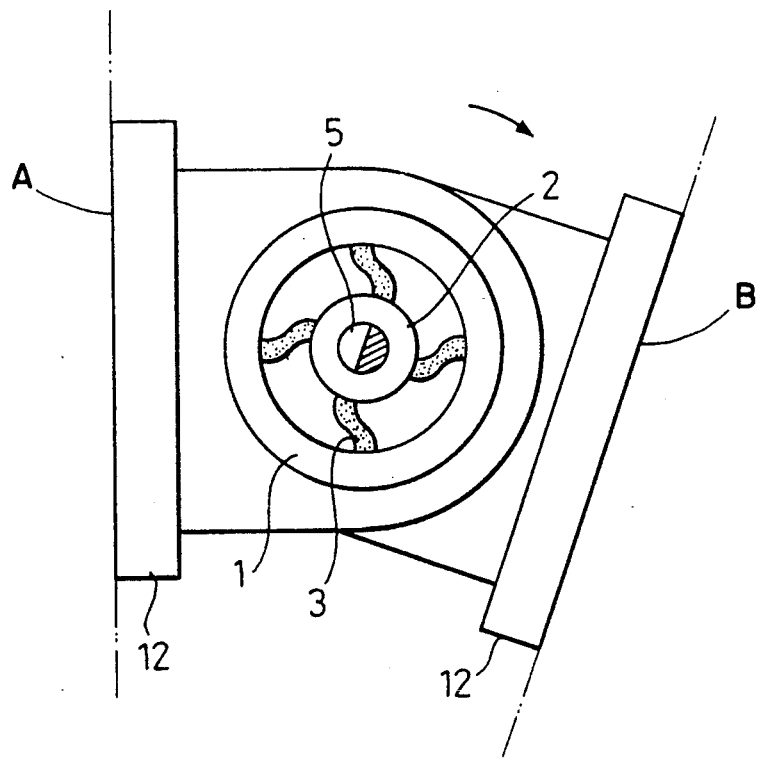
FIG. 5 is an elevational view of the device shown in FIG. 4 after deformation.

As shown in FIG. 1, the inventive vibration absorbing device S comprises outer and inner ring members 1 and 2, interconnecting members 3, and a steel connecting pin or shaft 5 inserted through the inner ring member 2. The normal, or at rest, condition of the inventive device is shown in FIG. 4 interconnecting structural members A and B. During vibration of structures A and B, the outer ring member 1 and the inner ring member 2 rotate slightly in opposite directions to each other. When this occurs, connecting members 3 are deformed by bending moments and shearing forces until they assume the configurations shown in FIG. 5. In the process, the inventive device S absorbs vibrational energy imposed on the structure to which the inventive devices S are strategically secured.

Figure 18:
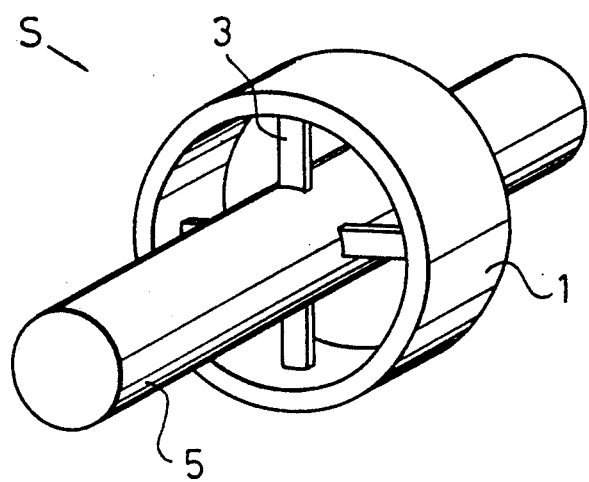
FIG. 18 is a perspective view of another embodiment of the invention, similar to FIG. 1, in which the outer ring and connecting pin are directly joined together by connecting members.

As shown in FIG. 18, the inventive device S comprises an outer ring member 1 and connecting members 3 radially projecting between the inner periphery of the outer ring member 1 and the outer periphery of the shaft 5, thereby eliminating the need for an inner ring member 2.

Figure 32:
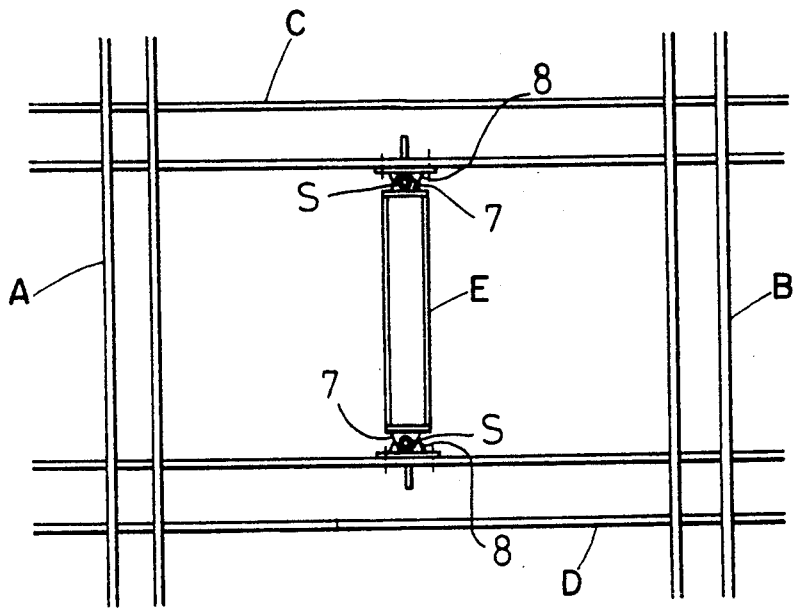
FIG. 32 is a schematic elevational view of an embodiment of the invention in which the inventive vibration absorbing device is installed on opposite ends of a non-structural member mounted between upper and lower structural beams of a structure.
Figure 34:
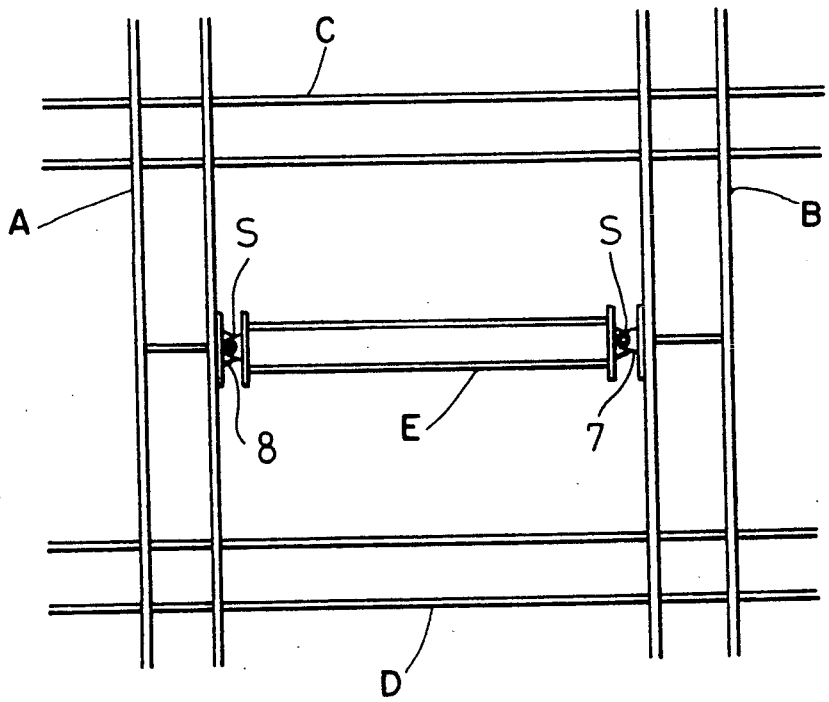
FIG. 34 is a schematic elevational view of an embodiment of the invention in which the vibration absorbing device is installed on opposite ends of a non-structural member mounted between the structural pillars of a structure.
Figure 36:
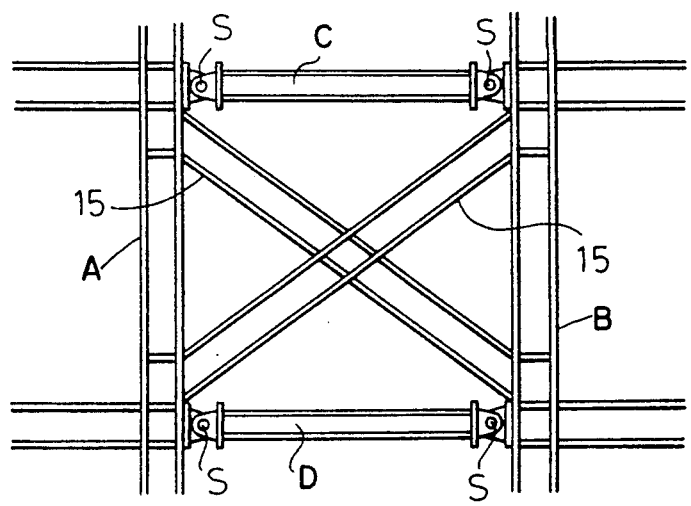
FIG. 36 is an elevational view of an embodiment of the invention in which vibration absorbing devices are installed on opposite ends of members mounted at the juncture of pillars and beams which are interconnected through rigidly joined cross braces.
Figure 37:
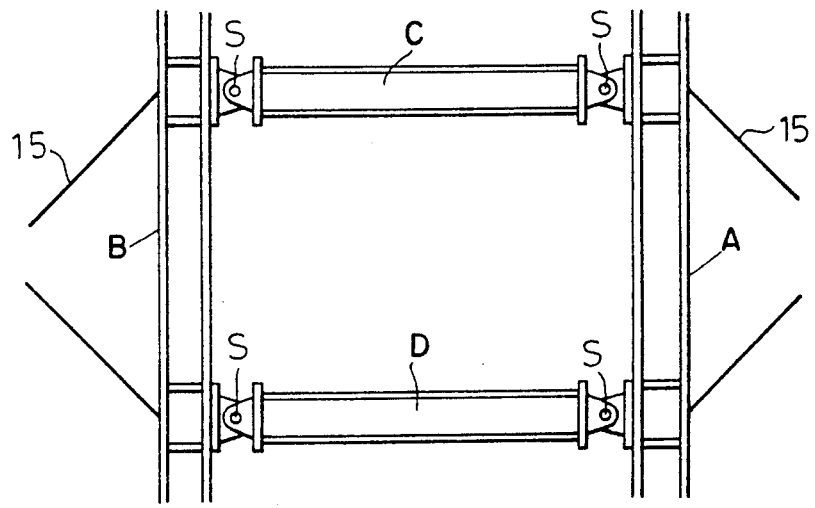
FIG. 37 is an elevational view of an embodiment of the invention in which vibration absorbing devices are installed on opposite ends of members which are intermediate the cross-braced members of FIG. 36.
Figure 38:
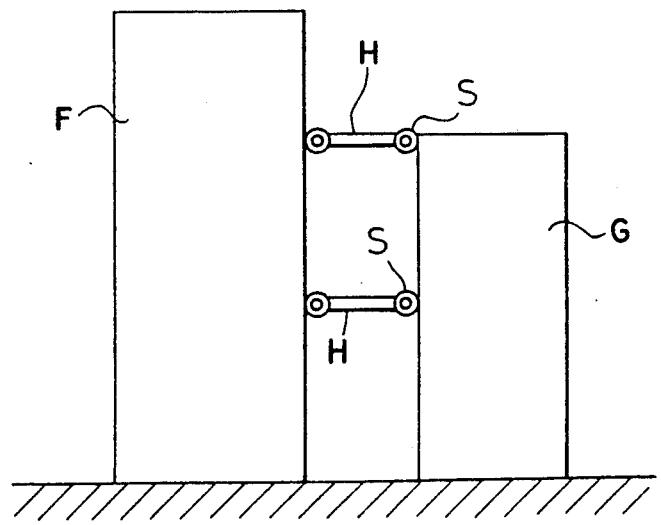
FIG. 38 is an elevational view of an embodiment of the invention in which vibration absorbing devices are installed on opposite ends of mounting members secured between structures having different natural vibration frequencies.

The vibration absorbing device S is usually installed in a structure in such manner that the outer ring 1 is fixed to a structural member A, B, C, or D, and the steel shaft 5 is fixed to a non-structural member E, as shown in FIGS. 32 and 34. However, the co-action between ring 1 and shaft 5 may be reversed by securing the shaft 5 to a structural member A, B, C, or D, and by securing ring 1 to a non-structural member E. In yet a third embodiment of the invention, both the ring 1 and the shaft 5 may be secured to structural members, as shown in FIGS. 36, 37, and 38.

Each connecting member 3 has an elasto-plastic deformability and is deformed by yielding to the relative rotation of the outer ring 1 and the steel shaft 5 due to a repetitively applied force or moment, so that the vibration absorbing device S absorbs the vibrational energy by hysteresis energy in elasto-plastic deformation of the connecting members 3.

Figure 16:
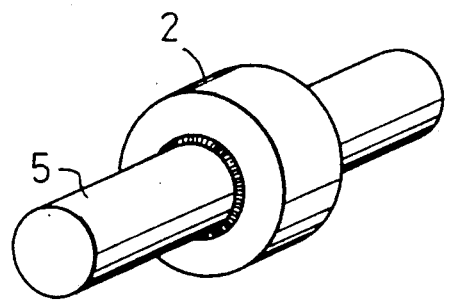
FIG. 16 is a perspective view of an inner ring welded to a connecting pin.
Figure 17:
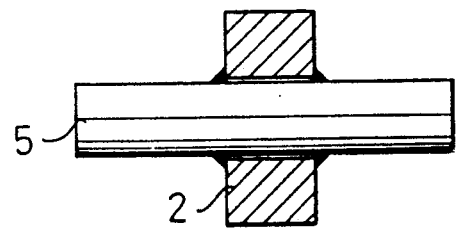
FIG. 17 is an elevational view, in partial section, of a sectional view taken along an axis of the embodiment of the invention shown in FIG. 16.

When the inner ring 2 is attached to the outer ring 1, as shown in FIG. 1, the steel shaft 5 is axially press fit into the inner ring 2 in order to transmit a turning force to the inner ring 2. As shown in FIGS. 6 through 10 and 12 through 14, various geometrical cross-sectional configurations may be utilized to transmit a torsional force from the shaft 5 to the ring 2. As shown in FIGS. 16 and 17, the shaft 5 is positively secured to ring 2 by welding. With these various connecting means between shaft 5 and ring 2, a torque applied by shaft 5 to ring 2 of sufficient force will cause connecting members 3 to elasto-plastically deform when ring 1 remains stationary or counter-rotates. The vibration absorbing device S may be manufactured without the inner ring 2 by directly joining the connecting members 3 to the peripheral surface of the steel shaft 5, as shown in FIG. 18.

The shape of the outer ring 1, the inner ring 2, and the steel shaft 5 is not limited to circular, as shown in FIGS. 1 through 5, but may be any desired shape, such as shown in FIGS. 6 through 10. The theoretical criterion for the configurations of the outer ring 1, the inner ring 2, and the steel shaft 5 is that the distance between opposite ends of each connecting member is increased by the rotation of the steel shaft 5 relative to the outer ring 1.

Figure 6:
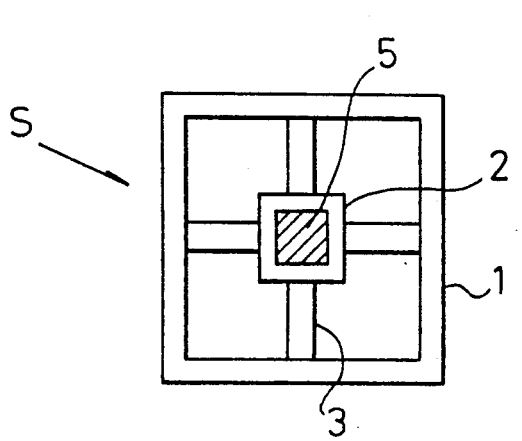
FIG. 6 is an elevational view of a preferred embodiment of the invention in which the ring members are rectangular in cross section.
Figure 7:
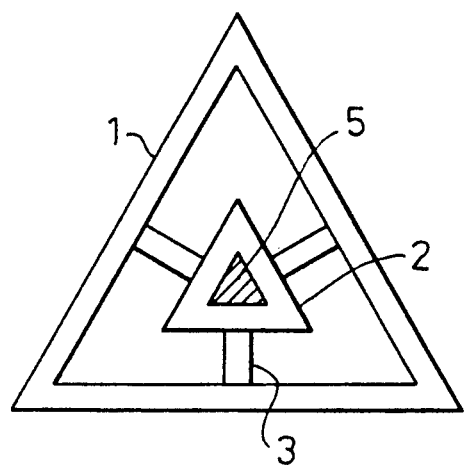
FIG. 7 is an elevational view of a preferred embodiment of the invention in which the ring members are triangular in cross section.
Figure 8:
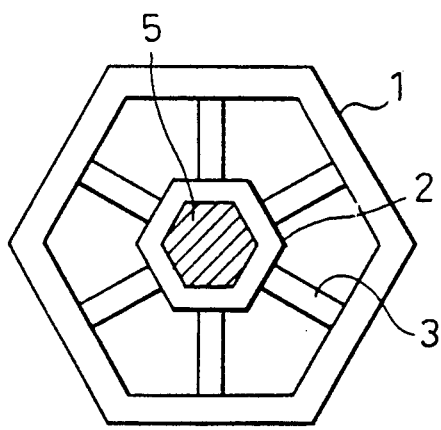
FIG. 8 is an elevational view of a preferred embodiment of the invention in which the ring members are hexagonal in cross section.
Figure 9:
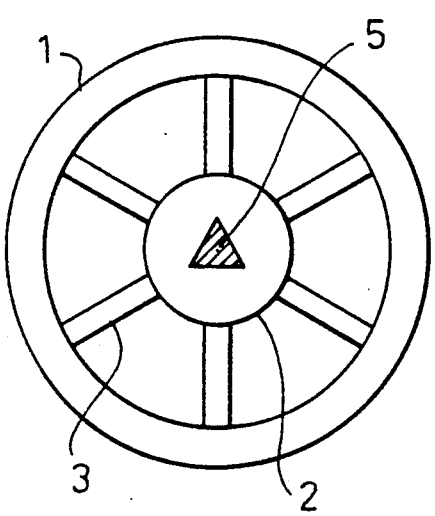
FIG. 9 is an elevational view of a preferred embodiment of the invention, similar to FIG. 1, in which the connecting pin is triangular in cross section.
Figure 10:
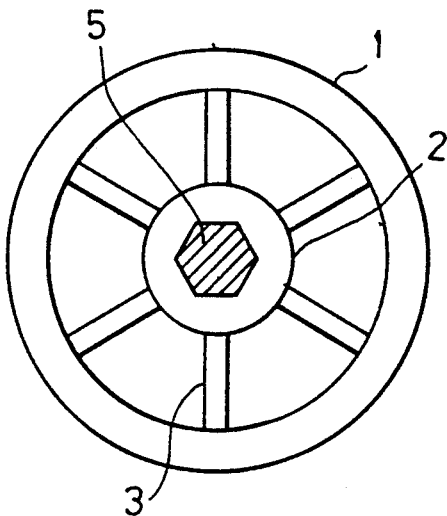
FIG. 10 is an elevational view of a preferred embodiment of the invention, similar to FIG. 1, in which the connecting pin is hexagonal in shape.

FIGS. 6 through 8 show modifications of the vibration absorbing device S, in which the inner ring 2, the outer ring 1, and the steel shaft 5 are respectively formed into polygons. FIGS. 9 and 10 show another modification of the vibration absorbing device S, in which only the steel shaft 5 and the inner peripheral surface of the inner ring 2 are polygons. The outer ring 1 and the inner ring 2 may assume other configurations.

The number of connecting members 3 provided between the outer ring 1 and the inner ring 2 is predetermined by the vibration absorbing capacity to be given to the vibration absorbing device S. The connecting members 3 are primarily secured between the outer ring 1 and the inner ring 2 or between the outer ring 1 and the steel shaft 5 by means of welding. However, the entire device may be manufactured by means of solid casting, including the outer ring 1 and the inner ring 2.

The embodiments of the vibration absorbing device S, as shown in FIGS. 6 through 10, are advantageous in that a close fit is not required between the inner ring 2 and the shaft 5, such as is required between a circular shaft 5 and a circular ring 2.

Figure 11:
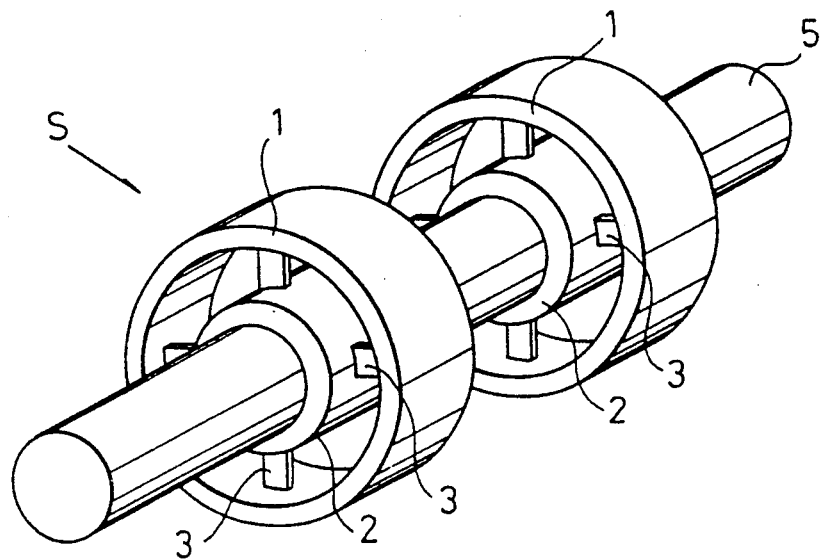
FIG. 11 is a perspective view of a preferred embodiment of the invention, similar to FIG. 1, in which two inventive devices are coupled to a single connecting pin.

FIG. 11 shows another embodiment of the vibration absorbing device S, in which a single steel shaft 5 is inserted through two vibration absorbing devices. The number of energy absorbing devices connected to the single steel shaft 5 is predetermined by the desired yield strength, rigidity, and energy absorbability required for the vibration absorbing device S. Specifically, when a plurality of vibration absorbing devices are interconnected, the individual devices may be selected from a stock of inventoried devices having predetermined capacities which may vary to meet different vibration absorbing requirements.

Figure 12:
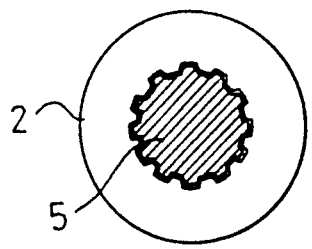
FIG. 12 is an elevational view showing a connecting pin in cross section provided with longitudinal ridges and grooves.
Figure 13:
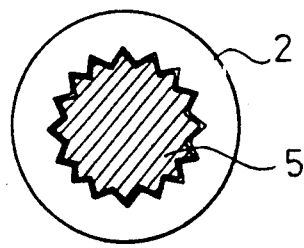
FIG. 13 is an elevational view showing a connecting pin in cross section provided with longitudinal serrations.

FIGS. 12 through 17 show various embodiments of means to connect the steel shaft 5 and the inner ring 2. FIG. 12 shows a castellated interfit between shaft 5 and ring 2. FIG. 13 shows a serrated interfit between these parts. In the event of tolerance between the parts, this space may be filled with an epoxy resin to prevent any time loss and/or play in the operation of the inner ring 2.

Figure 14:
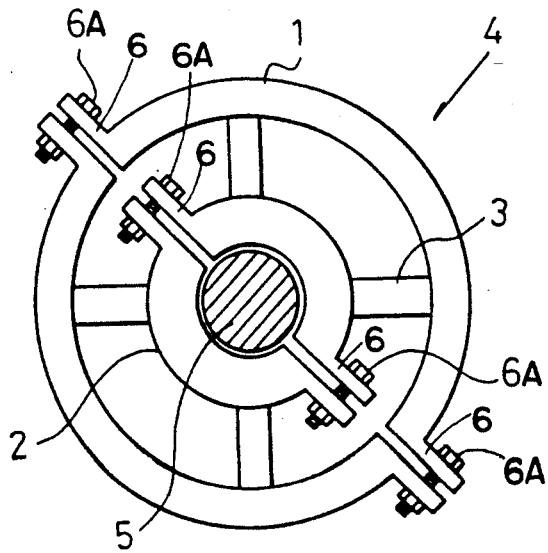
FIG. 14 shows an embodiment of the invention, similar to FIG. 1, in which the inner and outer rings are each split and joined together by flanges and threaded fastener means.

FIG. 14 shows another embodiment of the invention, in which the outer ring 1 and the inner ring 2 are respectively divided into two parts with connecting flanges 6, which are adapted to secure the rings together with threaded fasteners 6A.

Figure 15:
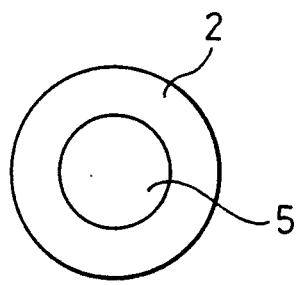
FIG. 15 is an elevational view of a connecting pin press fit in an inner ring.

FIG. 15 is schematically illustrative of pressure fit means of securing a shaft 5 in a ring 2. The pressure fit may be obtained by driving or press-fitting the steel shaft 5 into the inner ring 2, or by shrink fit means, wherein use is made of thermal expansion of the inner ring 2. The vibration absorbing device S shown in FIG. 1 is manufactured by securing the steel shaft 5 in the inner ring 2 according to the shrink-fit method.

Hereinafter will be described the relation between the rotation of the steel shaft 5 relative to the outer ring 1 and the deformation of the connecting members 3.

Figure 2:
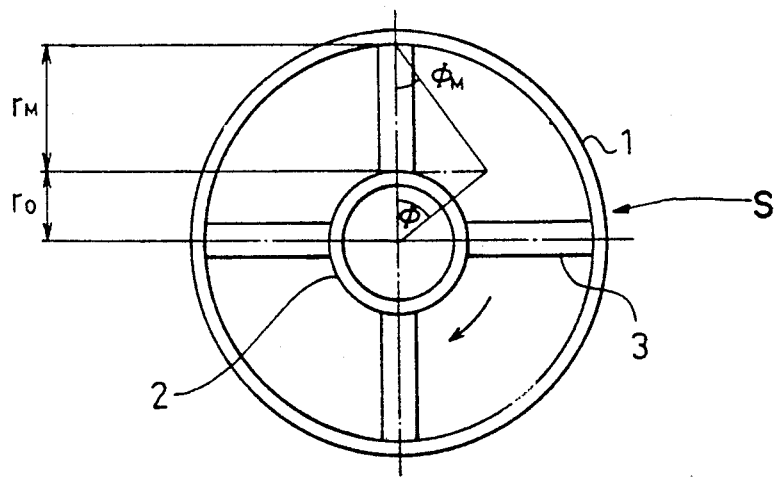
FIG. 2 is an elevational view of a preferred embodiment of the invention in which the connecting members are larger than the radius of the inner ring.
Figure 3:
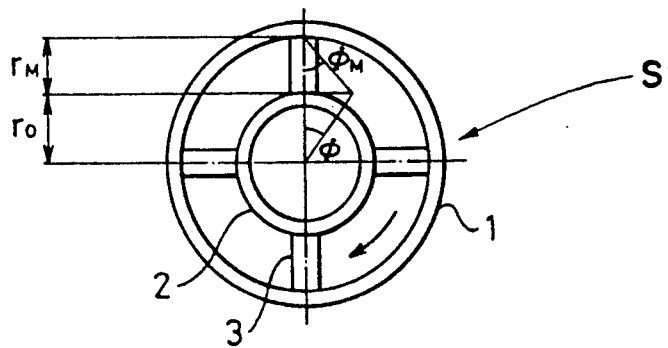
FIG. 3 is an elevational view of a preferred embodiment of the invention in which the connecting members are shorter in length than the radius of the inner ring.

As shown in FIG. 2, the radius of the inner ring 2 to its outer peripheral surface is indicated as $r_0$, and the height of each connecting member 3 is indicated as $r_M$. Each connecting member 3 is subjected to forcible deformation by a rotational angle of $\phi M = r_0/r_M \cdot \phi$ from $r_0 \cdot \tan \phi = r_M \cdot \tan \phi_M$ with the rotation of the steel shaft 5 by an angle $\phi$ to result in the deformed condition shown in FIG. 5. According to this relation, by setting the height $r_M$ of each connecting member 3 to be smaller than $r_0$, i.e., $r_M < r_0$ as shown in FIG. 3, the rotational angle $\phi_M$ of each connecting member 3 is enlarged to be $r_0/r_M$ times as large as the rotational angle $\phi$ of the steel shaft 5, so that the amount of deformation of each connecting member, i.e., the amount of energy absorption will be enlarged. Accordingly, the amount of energy absorption is adjusted at will by properly selecting the radius $r_0$ of the inner ring 2 and the height $r_M$ of each connecting member.

Further, the rotational angle $\phi$ of the steel shaft 5 corresponds to an interlayer deformation angle between upper and lower stories of the structure or like deformation angle in relative deformation between the structural member $K_1$ and non-structural member $K_2$, to which the vibration absorbing device S is connected.

FIGS. 19 through 21 show embodiments of the manufacture of the vibration absorbing device S, in which the length of each connecting member 3 is greater than the radius of the inner ring 2. FIGS. 23 through 25 show embodiments of the vibration absorbing device 4, in which the length of each connecting member is less than the radius of the inner ring 2. As described above, the height of each connecting member 3 and the radius of the inner ring 2 in these embodiments are selectively determined according to a predetermined required amount of energy absorption.

FIGS. 19 and 23 show the connecting members 3, each of which has the same cross-sectional width throughout its height, while FIGS. 20, 21, 24, and 25 show the connecting members 3, each of which is constricted in its midsection so as to be made to correspond to the distribution of bending moment shown on each connecting member 3, i.e., the substantially linear distribution with the maximum bending moment on both ends and the minimum bending moment on the middle when the connecting members 3 are subjected to the forcible deformation in the positive and negative directions. Each connecting member 3 substantially simultaneously yields throughout its length as a function of its energy absorbability.

FIGS. 22 and 26 respectively show sections taken along axes of the energy absorbing rings of FIGS. 19 and 23.

Next will be described embodiments of the installation of the vibration absorbing device S to the structure.

FIG. 27 shows one embodiment of an installation in which the vibration absorbing device S is mounted between a structural member $K_1$ of the structure and a non-structural panel $K_2$. As shown in FIG. 27, the vibration absorbing device S functions as a pin for interconnecting the pin-jointed structural member $K_1$ and non-structural member $K_2$.

In FIGS. 28 and 29, showing enlarged details of FIG. 27, the vibration absorbing device S is connected to the structural member $K_1$ and to non-structural member $K_2$ through brackets 7 and 8 respectively joined to the steel shaft 5 and the outer ring 1.

The bracket 8 is joined to non-structural member $K_2$ by an anchor bolt 9, and the bracket 7 is joined by bolts 11 to a fixed block 10 integrally secured to the structural member $K_1$. Also, in this embodiment, the outer ring 1 is formed as a part of the bracket 8 to completely unite the outer ring 1 and the bracket 8 together, while the outer ring 1 is united with the steel shaft 5 by fixing the bracket 7 to threaded portions of both ends of the steel shaft 5 with nuts 5A.

FIGS. 30 and 31 schematically show the behavior of the panel $K_2$ of the embodiment of FIGS. 27 through 29, wherein a pillar P and the structural member $K_1$ are respectively represented by longitudinal and lateral lines for simplification. When the condition of the panel shown in FIG. 30 becomes that shown in FIG. 31 due to vibrational forces, each connecting member 3 is deformed by the rotational angle $\phi M$ relative to the deformation angle $\phi$ of the structure as described above, and the rotational angle $\phi M$ is enlarged with the adjustment of the connecting member height $r_M$ to absorb the energy on upper and lower ends of the non-structural panel $K_2$.

The yield strength of each connecting member 3 is less than the bending yield strength of the surface of the panel $K_2$, and the proportion of vibration absorption of the single vibration absorbing device S is low compared to the vibrational energy of the whole structure. Because the vibration absorbing device S is small, a plurality of these devices may be connected to a single panel $K_2$, so that a required total amount of energy absorption may be provided.

FIG. 32 shows another application of the invention, in which non-structural member E is vertically mounted between structural members C and D of the frame of the structure by means of a pair of vibration absorbing devices S.

FIG. 34 shows another application of the invention, in which the non-structural member E is horizontally mounted between the vertical structural members A and B of the frame by means of vibration absorbing devices S, similar to the embodiment of FIG. 32. As in the embodiment of FIG. 32, the vibration absorbing devices S are connected between the structural members A and B and non-structural member E by means of brackets 7 and 8, as best shown in FIG. 28.

FIG. 36 shows a still further application of the invention, in which cross braces 15 are rigidly secured to structural members A and B, and vibration absorbing devices S are installed on opposite ends of non-structural members C and D, horizontally mounted between structural members A and B and secured thereto by the vibration absorbing devices S.

Though not shown in FIG. 36, the vibration absorbing device S may also be installed on opposite ends of the braces 15 in addition to, or in lieu of, the S devices secured to the opposite ends of structural members C and D.

FIG. 37 shows a still further application of the invention, in which a first structural frame comprising a first set of structural frame members A, B, C, and D is secured to a second structural frame comprising a second set of structural frame members A, B, C, and D, by means of non-structural members C and D. Vibration absorbing devices S are installed on opposite ends of non-structural members C and D horizontally mounted between structural members A and B and secured thereto by the vibration absorbing devices S.

FIG. 38 shows a still further application of the invention, in which the vibration absorbing devices S are installed between structures F and G, different from each other in natural frequency, and non-structural interconnecting members H.

Figure 39:
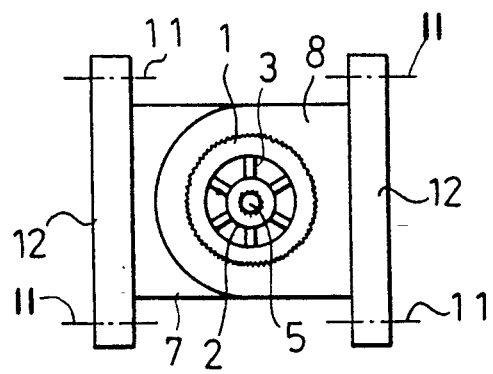
FIG. 39 is an elevational view of a modified embodiment of the invention, similar to FIG. 1, taken along the line 39—39 of FIG. 40.
Figure 40:
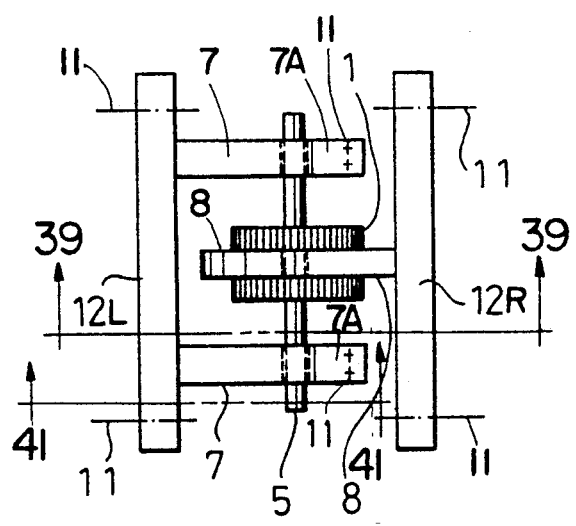
FIG. 40 is a plan view of the invention substantially shown in FIG. 39.
Figure 41:
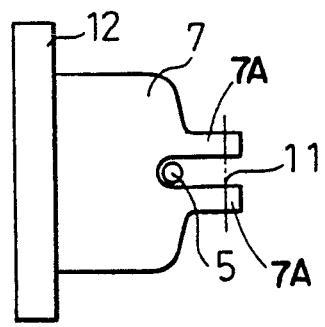
FIG. 41 is a fragmentary elevation of the invention taken substantially along the line 41—41 of FIG. 40.

FIGS. 39 through 41 show yet another embodiment of the vibration absorbing device S. In this embodiment, the brackets 7 and 8 are respectively united to the steel shaft 5 and the outer ring 1 and secured to plates 12L and 12R, which are, in turn, connected to structural and non-structural members respectively, such as A, B, and C, D of FIG. 36. Bolts 11 are used for joining the plates 12 to the respective structural and non-structural members. The outer ring 1 is united with the bracket 8, while the steel shaft 5 is united with the brackets 7 by fastening flanges 7A projecting from brackets 7 and secured thereto by means of bolts 11, adapted to clamp the steel shaft 5 between the flanges 7A, as shown in FIG. 41.

Figure 33:
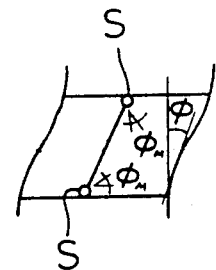
FIG. 33 is a schematic diagram showing the deformation of the structure shown in FIG. 32.
Figure 35:
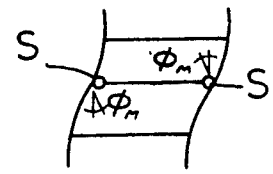
FIG. 35 is a schematic diagram showing the deformation of the structure shown in FIG. 34.

In the embodiments described herein, each connecting member 3 of the vibration absorbing device S is deformed by the rotational angle $\phi$ relative to the interlayer deformation angle $\phi$, i.e., the rotational angle $\phi$ of the steel shaft 5 to the outer ring 1, as shown in FIGS. 33 and 35, which diagrammatically show the frame in deformation.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

We claim:

1. A vibration absorbing device to protect a building, having first and second building members, against vibration caused by seismic tremors and/or wind, comprising: a first vibration absorbing member adapted to be arcuately shifted in a first direction and rigidly securable to said first building member; a second vibration absorbing member adapted to be arcuately shifted in a direction opposite to that of said first vibration absorbing member and rigidly securable to said second building member; said first and second vibration absorbing members being secured together by elasto-plastic connecting members being secured together by of at least one of said vibration absorbing members absorbs vibration energy by elasto-plastically deforming said elasto-plastic connecting members.

2. The vibration absorbing device of claim 1, wherein said first building member is a structural member and said second building member is a non-structural member.

3. The vibration absorbing device of claim 1, wherein said first building member is a non-structural member and said second building member is a structural member.

4. The vibration absorbing device of claim 1, wherein said first and second building members are structural members.

5. The vibration absorbing device of claim 1, wherein said first and second building members are non-structural members.

6. The vibration absorbing device of claim 1, wherein said elasto-plastic connecting members have end portions and midsections and are constricted at their midsections to provide maximum bending moment at their end portions and minimum bending moment at their midsections when said connecting members are subjected to forces of vibration causing elasto-plastic deformation.

7. The vibration absorbing device of claim 1, wherein said first vibration absorbing member is hollow, said second vibration absorbing member is positioned concentrically within said first vibration absorbing member and said elasto-plastic connecting members are radially aligned and adapted to space apart said first and second vibration absorbing members.

8. The vibration absorbing device of claim 7, wherein the inner peripheral geometrical configuration of said first vibration absorbing member and the outer peripheral geometrical configuration of said second vibration absorbing member are the same.

9. The vibration absorbing device of claim 1, wherein said first vibration absorbing member is hollow and the inner peripheral geometrical surface configuration of said first vibration absorbing member and the outer peripheral geometrical surface configuration of said second vibration absorbing member are cylindrical and concentric, and said elasto-plastic connecting members are radially aligned therebetween and adapted to space apart said first and second vibration absorbing members.

10. The vibration absorbing device of claim 9, wherein the radial length of said connecting members is a function of the vibrational energy each vibration absorbing device is predetermined to absorb.

11. The vibration absorbing device of claim 9, wherein said second vibration absorbing member is hollow with an inner peripheral circular surface concentric with said outer peripheral surface and a circular shaft received within said second vibration absorbing member and rigidly secured thereto, said shaft being rigidly secured to said second building member.

12. The vibration absorbing device of claim 11, including a plurality of vibration absorbing devices secured to said shaft.

13. The vibration absorbing device of claim 10, wherein said vibration absorbing members comprise split rings secured together by threaded fasteners.

* * * * *

UNITED STATES PATENT AND TRADEMARK OFFICE
CERTIFICATE OF CORRECTION

PATENT NO. : 5,097,547
DATED : Mar. 24, 1992
INVENTOR(S) : Tanaka et al.

It is certified that error appears in the above—identified patent and that said Letters Patent is hereby corrected as shown below:

Column 9, line 12, after "by" insert:

--elasto-plastic connecting members, whereby arcuate shifting--.

Signed and Sealed this

First Day of June, 1993

Attest:

MICHAEL K. KIRK

Attesting Officer

Acting Commissioner of Patents and Trademarks